(12) United States Patent
Walker et al.

(10) Patent No.: US 9,727,621 B2
(45) Date of Patent: Aug. 8, 2017

(54) SYSTEMS AND METHODS FOR SERVICING DATABASE EVENTS

(71) Applicant: Change Healthcare LLC, Alpharetta, GA (US)

(72) Inventors: Patricia C. Walker, Jenks, OK (US); Scott McCarty, Broken Arrow, OK (US)

(73) Assignee: Change Healthcare LLC, Alpharetta, GA (US)

( * ) Notice: Subject to any disclaimer, the term of this patent is extended or adjusted under 35 U.S.C. 154(b) by 0 days.

(21) Appl. No.: 14/674,366

(22) Filed: Mar. 31, 2015

(65) Prior Publication Data

US 2016/0292019 A1    Oct. 6, 2016

(51) Int. Cl.
*G06F 17/30*    (2006.01)

(52) U.S. Cl.
CPC .............. *G06F 17/30545* (2013.01)

(58) Field of Classification Search
CPC ..... G06F 9/542; G06F 9/546; G06F 17/30557
See application file for complete search history.

(56) References Cited

U.S. PATENT DOCUMENTS

| | | | |
|---|---|---|---|
| 5,628,530 A | 5/1997 | Thornton | |
| 6,012,035 A | 1/2000 | Freeman et al. | |
| 6,757,898 B1 | 6/2004 | Ilsen et al. | |
| 6,769,228 B1 | 8/2004 | Mahar | |
| 6,889,231 B1 * | 5/2005 | Souder ............. | G06F 17/30575 |
| 7,031,974 B1 * | 4/2006 | Subramaniam ... | G06F 17/30575 |
| 7,155,397 B2 | 12/2006 | Alexander et al. | |
| 2002/0002495 A1 | 1/2002 | Ullman | |
| 2002/0087583 A1 | 7/2002 | Morgan et al. | |
| 2002/0111832 A1 | 8/2002 | Judge | |
| 2002/0198831 A1 | 12/2002 | Patricelli et al. | |
| 2003/0009367 A1 | 1/2003 | Morrison | |
| 2003/0050799 A1 | 3/2003 | Jay et al. | |

(Continued)

FOREIGN PATENT DOCUMENTS

| | | |
|---|---|---|
| CA | 2482370 | 3/2006 |
| WO | 9503569 | 2/1995 |

(Continued)

OTHER PUBLICATIONS

Eitan Blumin, Service broker sample: Asynchronous Tirggers, Dec. 4, 2013, pp. 1-20.*

(Continued)

*Primary Examiner* — Syed Roni
(74) *Attorney, Agent, or Firm* — Meunier Carlin & Curfman LLC

(57) ABSTRACT

Provided are systems and methods for determining, by a master queue service, that one or more database event records are present in a master input queue, wherein each of the one or more database event records corresponds to an occurrence of an event at a database, causing, by the master queue service, moving of the one or more database event records from the master input queue to a master output queue, determining, by the master queue service, one or more processes associated with the one or more database event records, and causing, by the master queue service, adding of the one or more database event records to one or more process queues for the one or more processes.

19 Claims, 3 Drawing Sheets

(56) References Cited

U.S. PATENT DOCUMENTS

| | | |
|---|---|---|
| 2003/0149625 A1 | 8/2003 | Leonardi et al. |
| 2003/0229540 A1 | 12/2003 | Algiene |
| 2004/0039599 A1 | 2/2004 | Fralic |
| 2004/0073457 A1 | 4/2004 | Kalies |
| 2004/0078234 A1 | 4/2004 | Tallal, Jr. |
| 2004/0117323 A1 | 6/2004 | Mindala |
| 2004/0148198 A1 | 7/2004 | Kalies |
| 2004/0193653 A1* | 9/2004 | Howard ............ G06F 17/30368 |
| 2004/0249745 A1 | 12/2004 | Baaren |
| 2005/0015280 A1 | 1/2005 | Gabel |
| 2005/0060201 A1 | 3/2005 | Connely, III et al. |
| 2005/0080651 A1 | 4/2005 | Morrison |
| 2005/0102169 A1 | 5/2005 | Wilson |
| 2005/0154627 A1 | 7/2005 | Zuzek et al. |
| 2005/0187793 A1 | 8/2005 | Myles |
| 2005/0193041 A1* | 9/2005 | Bourbonnais ..... G06F 17/30578 |
| 2005/0197862 A1 | 9/2005 | Paterson et al. |
| 2005/0240473 A1 | 10/2005 | Ayers, Jr. et al. |
| 2005/0288972 A1 | 12/2005 | Marvin et al. |
| 2006/0020514 A1 | 1/2006 | Yered |
| 2006/0026041 A1 | 2/2006 | Ullman |
| 2006/0149784 A1 | 7/2006 | Tholl et al. |
| 2006/0184391 A1 | 8/2006 | Barre et al. |
| 2006/0259363 A1 | 11/2006 | Jhetam |
| 2007/0005402 A1 | 1/2007 | Kennedy et al. |
| 2007/0050209 A1 | 3/2007 | Yered |
| 2007/0088566 A1 | 4/2007 | Berkelhamer |
| 2007/0136100 A1 | 6/2007 | Daugherty et al. |
| 2007/0233525 A1 | 10/2007 | Boyle |
| 2007/0233526 A1 | 10/2007 | Hoffman |
| 2007/0239493 A1 | 10/2007 | Sweetland et al. |
| 2009/0070391 A1* | 3/2009 | Blair ................. G06F 17/30581 |
| 2009/0287350 A1 | 11/2009 | Johnson et al. |
| 2011/0084135 A1 | 4/2011 | Philippe |
| 2014/0052690 A1* | 2/2014 | Kamireddy ....... G06F 17/30377 707/624 |

FOREIGN PATENT DOCUMENTS

| | | |
|---|---|---|
| WO | 0039737 | 7/2000 |
| WO | 2007025295 | 3/2007 |

OTHER PUBLICATIONS gmatteson, SQL Server 2012. Update second table based on input from first table, Nov. 19, 2013 pp. 1-2.*

Non-Final Office Action for U.S. Appl. No. 13/536,444 mailed Dec. 5, 2013.

Final Office Action for U.S. Appl. No. 13/536,444 mailed Mar. 6, 2014.

Non-Final Office Action for U.S. Appl. No. 13/536,444 mailed Sep. 11, 2014.

Final Office Action for U.S. Appl. No. 13/536,444 mailed May 21, 2015.

Sampson, R.J., "Taking Control of Health Care Costs," Best's Review—Life Health Insurance Edition, Nov. 1983, vol. 84, Issue 7, USA; Abstract Only.

Anonymous, "ACS to Demonstrate Electronic Health Record Solution Suite at MMIS 2007 Conference; EHR Tools Consolidate Data, Provide Useful Information at the Point of Care for Medicaid Providers, Payers and Patients," PR Newswire, Aug. 13, 2007, New York, NY, USA.

Lamb, J., "New Era of Electronic Medicine Management: E-Prescriptions, Britain's Traditionally Cautious National Health Service is Starting Trials for Online Prescription, with the Aim of Cutting Costs," Financial Times, London, Feb. 21, 2001, p. 6, London, United Kingdom.

Anonymous, "Pharmacy Industry Leaders Launch Firm to Supply Real-Time Data," PR Newswire, Jul. 30, 2001, p. 1, New York, NY, USA.

Anonymous, "Medic; On-line Goes In-House, Chain Store Age Executive," Jan. 1987, vol. 63, Issue 1, USA; Abstract only.

Anonymous, "TechRx Announces Successful Beta Deployment of T-Rex," PR Newswire, May 13, 2002.

Non-final Office Action for U.S. Appl. No. 13/536,444 mailed Feb. 12, 2016.

* cited by examiner

SYSTEMS AND METHODS FOR SERVICING DATABASE EVENTS

TECHNICAL FIELD

Aspects of the disclosure relate generally to databases, and more particularly, to systems and methods for servicing database events.

BACKGROUND

A database is an organized collection of data. Data stored in a database is typically organized in a manner to provide efficient access to the data. For example, in the context of a healthcare database storing healthcare data, the data may be stored in tables having rows that correspond to healthcare claims by patients. Database management systems (DBMSs) are computer software applications that interact with the user, other applications, and the database itself to capture and analyze data. A general-purpose DBMS can be designed to allow the definition, creation, querying, update, and administration of databases. A DBMS often employs query languages, such as a structured query language (SQL), that enable users or other applications to access database data, via query or other request. A database trigger is code, often provided in a DBMS that is automatically executed in response to certain events on a particular table or view in a database. Database triggers are often used for maintaining the integrity of information on a database. For example, when a new record representing a new healthcare claim by a patient is added to a claims table of a database, new records may need to be created in the related database tables, such as a table listing all of the patients that have submitted a healthcare claim, or the like. Unfortunately, when database events, such as changes to database data, occur frequently the performance of the database can suffer. For example, if a healthcare database is being edited at a high frequency due to the number of healthcare providers submitting changes to the database data, the number triggers and the resulting operations executed by the triggers to effectuate the changes can result in significant delay, bogging down the DBMS and blocking access to the database as the changes are processed. Therefore, a need exists for systems and methods for improving the performance of databases, including efficiently servicing database events, such as changes to database information.

SUMMARY

Example embodiments disclosed herein may include systems and methods for servicing changes to database information. In an example embodiment, provided is a computer-implemented method for determining, by a master queue service, that one or more database event records are present in a master input queue, wherein each of the one or more database event records corresponds to an occurrence of an event at a database, causing, by the master queue service, moving of the one or more database event records from the master input queue to a master output queue, determining, by the master queue service, one or more processes associated with the one or more database event records, and causing, by the master queue service, adding of the one or more database event records to one or more process queues for the one or more processes.

In accordance with another embodiment, provided is a system that includes at least one memory operable to store computer-executable instructions and at least one processor configured to access the at least one memory and execute the computer-executable instructions to: determine, by a master queue service, that one or more database event records are present in a master input queue, wherein each of the one or more database event records corresponds to an occurrence of an event at a database, cause, by the master queue service, moving of the one or more database event records from the master input queue to a master output queue, determine, by the master queue service, one or more processes associated with the one or more database event records, and cause, by the master queue service, adding of the one or more database event records to one or more process queues for the one or more processes.

In accordance with another embodiment, provided is a non-transitory computer readable storage medium comprising program instructions stored thereon that are executable by one or more processors to: determine, by a master queue service, that one or more database event records are present in a master input queue, wherein each of the one or more database event records corresponds to an occurrence of an event at a database, cause, by the master queue service, moving of the one or more database event records from the master input queue to a master output queue, determine, by the master queue service, one or more processes associated with the one or more database event records, and cause, by the master queue service, adding of the one or more database event records to one or more process queues for the one or more processes.

BRIEF DESCRIPTION OF THE DRAWINGS

Reference will now be made to the accompanying drawings, which are not necessarily drawn to scale, and wherein.

DETAILED DESCRIPTION OF EXAMPLE EMBODIMENTS

Figure 1:
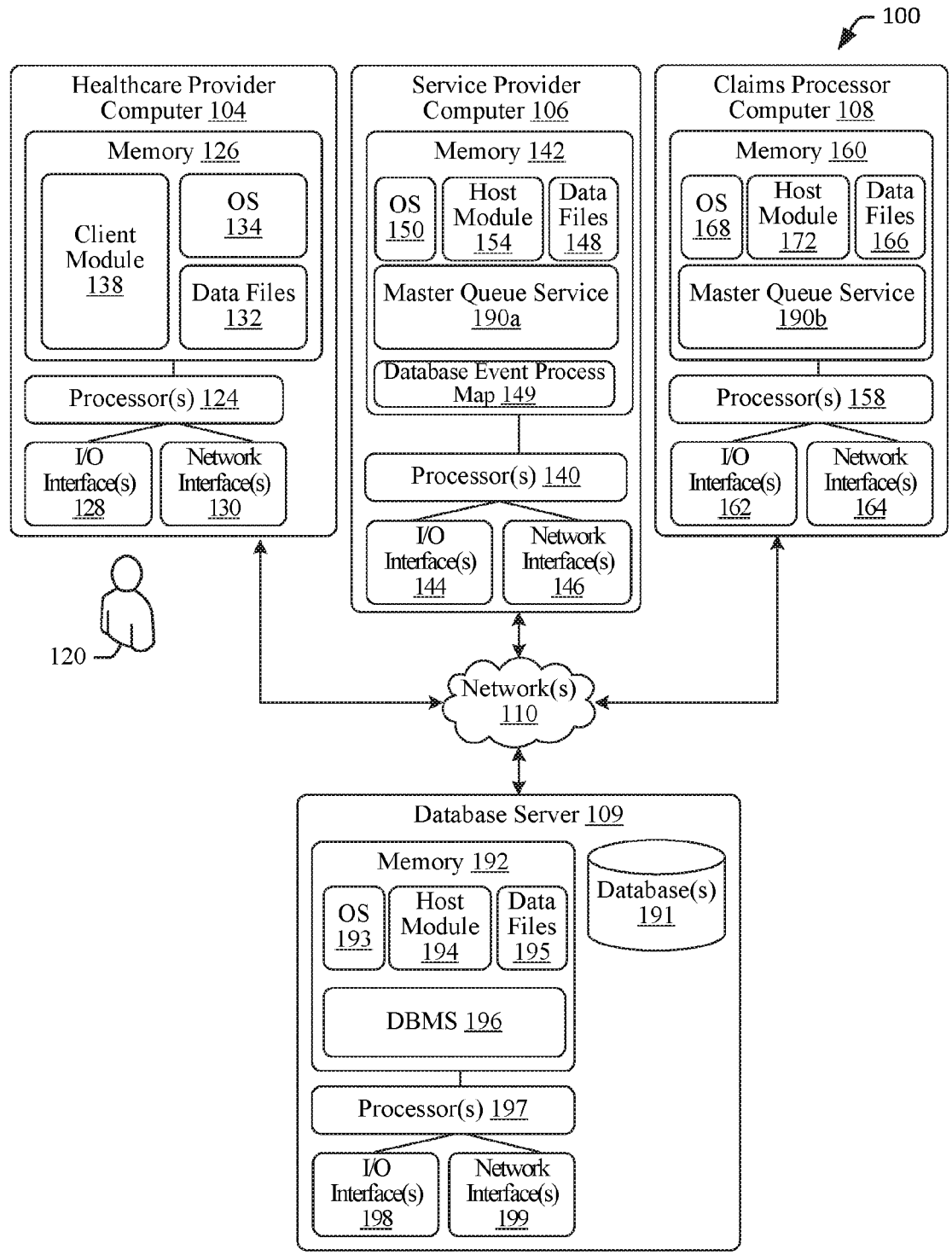
FIG. 1 is a block diagram that illustrates an example overview of a healthcare data environment in accordance with an example embodiment.

Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical, elements throughout.

Example embodiments described herein include systems and methods that facilitate servicing database events, such as changes to database information. In the context of a healthcare system with databases including healthcare data, such as database tables of healthcare claims submitted by patients, some embodiments can provide for identifying database events, such as changes to the database tables, and taking appropriate actions in view of the database events, such as propagating the changes to other tables throughout the healthcare system. In some embodiments, the healthcare system can employ a master queue service (also referred to as a "MQS" or "master service") that acts as a conduit to receive indications of database events, to identify processes that may rely on or otherwise be interested in the database events, and to provide indications of the database events to those processes so that the processes can take appropriate action in response to the events. Continuing with the above example relating to a healthcare system, a master queue service may receive, from a database trigger of a database management system (DBMS) of the healthcare system, one or more database event records that indicate a change to a database, including, for example, a database event record that indicates a change to a patient's name (e.g., from "J Doe" to "John Doe") in a claims table of the database. The master queue service may determine one or more processes of the healthcare system (and/or processes of entities outside of the healthcare system) that may need to take action based on the change, or may otherwise need to be informed of the change, and the master queue service may forward the one or more database event records (or indications thereof) to the one or more processes. Now aware of the database events, each of the one or more processes can individually process the database events. For example, each process can assess the database events associated with the database event records, determine whether the process requires additional action as a result of the database event (e.g., update another table to reflect the change of the patient's name from "J Doe" to "John Doe"), and perform any appropriate actions.

In some embodiments, the master queue service employs one or more queues for managing the event records. The master queue service may employ, for example, a master input queue, a master output queue, and/or one or more process queues. The master input queue may include a table or other storage location to which one or more database triggers can write database event records. The master output queue may include a table or similar location to which one or more database events stored in the input queue can be moved. That is the master queue service may move, from the master input queue to the master output queue, database event records written to the master input queue by one or more database triggers. As described herein, such a multi-queue configuration may enable the master queue service to efficiently intake database event records, significantly reducing the amount of time the database trigger may be blocked from writing to the master input queue, allowing the database trigger to quickly and efficiently process database events, including executing the writing of data event records to the master input queue. This can help to reduce delays associated with execution of the database triggers, thereby improving the overall performance of the database and the DBMS. Continuing with the above example relating to a healthcare system, the master queue service may maintain a master input queue and a master output queue, and each process may be associated with a respective process queue. Upon the change of the patient's name in the claims table of the database, the database trigger of the database management system (DBMS) of the healthcare system may be automatically executed to write to the master input queue, a database event record that includes a key value identifying a row of the table at which the change occurred (e.g., a claim ID "1234" uniquely identifying the row of the table that contains the information that changed). The master queue service may subsequently determine that the master input queue includes one or more database event records (including the database event record having the key value of "1234") and, in response to the determination, the master queue service move the one or more database event records from the master input queue to the master output queue. This may be accomplished, for example, by an atomic operation, such as a Microsoft SQL Server® (SQL) OUTPUT operation or other procedure, initiated by the master queue service, that executes both writing the one or more database event records to the table of the master output queue and deleting (or otherwise removing) of the one or more database event records from the table of the master input queue simultaneously (e.g., in the same transaction).

As described above, the master queue service may determine one or more processes of the healthcare system (and/or processes of entities outside of the healthcare system) that may need to take action based on the database event, or may otherwise need to be informed of the database event, and may move the one or more database event records (or indications thereof) to a respective process queue for each of the one or more processes. For example, if three processes, including process A, process B and process C are identified as being associated with the one or more database event records, then the master queue service may move the one or more database event records to each of a first process queue (process queue A) for process A, a second process queue (process queue B) for process B and a third process queue (process queue C) for process C. In some embodiments, the move operation may not delete the database event records from the master output queue until it is determined that the database event records have been successfully copied to each of the process queues. Such a monitoring procedure may help to ensure data integrity, preventing loss of database event record data by deleting a database event record from the master output queue only after it has reached its destination. Continuing with the above example, the master queue service may initiate a copy operation to copy the one or more database event records (including the database event record having the key value of "1234") from the master output queue to the process queues A, B and C, and delete the one or more database event records from the master output queue in response to receiving an indication that the one or more database event records have been successfully written to the process queues A, B and C. In some embodiments, if the master queue service does not receive an indication that the one or more database event records have not been successfully written to the destination process queues, then the master queue service may reattempt to copy the one or more database event records to the process queues. For example, if the master queue service receives an indication that the one or more database event records were successfully written to the process queues A and B, but does not receive such an indication for the write to process queue C, then the master queue service may reattempt to copy the one or more database event records to the process queue C.

In some embodiments, the master queue service is separate from the database. For example, the master queue service may be a business logic layer, such as an application of an operating system (e.g., a service application of the Microsoft Windows® operating system), that is separate from a DBMS. The master queue service may make calls to the DBMS to effectuate its operations. For example, the master queue service may initiate an "output" procedure, such as make an SQL OUTPUT call to the DBMS, to move one or more database event records from the table of the master input queue to the table of the master output queue. Further, the master queue service may make initiate an "insert" procedure, such as an SQL INSERT INTO call to the DBMS, to insert the one or more database event records (e.g., including the change record having a key value of "1234") into the process queues A, B and C, and the master queue service may initiate a "delete" procedure, such as a SQL DELETE FROM call to the DBMS, to remove the one or more database event records (e.g., including the change record having a key value of "1234"), from the master output queue. Any of the above described procedures and referenced SQL calls may be included by a stored procedure that is called for DBMS s which support stored procedures in order to take advantage of performance characteristics provided by the stored procedures.

In some embodiments, the database triggers are integrated within a DBMS. For example, the database triggers may include code of the DBMS that is automatically executed in response to certain database events, such as a change of data of a database table or view in a database. A database trigger may be executed automatically in response to a database event, and write a corresponding database event record to the master input queue of the master queue service. In some embodiments, a database trigger may include a minimal amount of code. This may enable the trigger to be executed quickly, thereby allowing the database to execute the trigger quickly, and move quickly to its next task, such as processing another database trigger event. In some embodiments, a database trigger may only include the code for writing a corresponding database event record to the master input queue of the master queue service. The database trigger may not include additional code to take other action, such as determining one or more processes that may need to take action based on the database event, or may otherwise need to be informed of the database event, providing the database event records (or indications thereof) directly to the one or more processes and/or to execute one or more processes. For example, a database trigger may not include code to automatically update a list of patient names in response to a change of a patient name in the claims table of the database.

Although certain embodiments are described in the context of healthcare data and databases for the purpose of illustration, the embodiments described herein can be employed with any suitable types of data and databases. Moreover, although certain embodiments are described in the context of certain types of database systems and languages, such as SQL, and certain types of services, such as services of the Microsoft Windows® operating system for the purpose of illustration, the embodiments described herein can be employed with any suitable type of database systems and languages, services, operating systems and/or the like.

System Overview

FIG. 1 is a block diagram that illustrates an example healthcare data system 100 according to an example embodiment. The example system 100 facilitates for servicing database events and will now be described illustratively with respect to FIG. 1. As shown in FIG. 1, the system 100 may include at least one healthcare provider computer 104, at least one service provider computer 106, and at least one claims processor computer 108.

As desired, each of the healthcare provider computer 104, service provider computer 106, and/or claims processor computer 108 may include one or more processing devices that may be configured for accessing and reading associated computer-readable media having stored thereon data and/or computer-executable instructions for implementing the various methods disclosed in the example embodiments discussed herein.

Additionally, in certain example embodiments, the service provider computer 106 may be in communication with one or more data storage devices, such as database 191. The database 191 may receive, store, and provide, as needed, healthcare transactions from the service provider computer 106. Alternatively, the data storage function may be included in the service provider computer itself, such as in the memory 142.

Generally, network devices and systems, including one or more of the healthcare provider computer 104, service provider computer 106, and claims processor computer 108 may include or otherwise be associated with suitable hardware and/or software for transmitting and receiving data and/or computer-executable instructions over one or more communication links or networks. These network devices and systems may also include any number of processors for processing data and executing computer-executable instructions, as well as other internal and peripheral components that are well known in the art. Further, these network devices and systems may include or be in communication with any number of suitable memory devices operable to store data and/or computer-executable instructions. By executing computer-executable instructions, each of the network devices may form a special purpose computer or particular machine. As used herein, the term "computer-readable medium" describes any form of suitable memory or memory device.

As shown in FIG. 1, the healthcare provider computer 104, service provider computer 106, claims processor computer 108, and database server 109 may be in communication with each other via one or more networks, such as network 110, which as described below can include one or more separate or shared private and public networks, including the Internet or a publicly switched telephone network. Each of these components—the healthcare provider computer 104, service provider computer 106, claims processor computer 108, database server 109, and the network 110 will now be discussed in further detail.

Each healthcare provider computer 104 may be associated with a healthcare provider, such as, for example, a pharmacy, physician's office, hospital, etc. The healthcare provider computer 104 may be any suitable processor-driven device that facilitates the processing of healthcare requests made by patients or consumers and the communication of information associated with healthcare transactions (e.g., healthcare claims transactions) to the service provider computer 106, such as a server computer (e.g., application server), a mainframe computer, one or more networked computers, a desktop computer, a personal computer, a digital assistant, a personal digital assistant, a digital tablet, an Internet appliance, an application-specific circuit, microcontroller, minicomputer, or any other processor-based device. In certain embodiments, each healthcare provider computer 104 may be a suitable point of sale device associated with a healthcare provider. The execution of the computer-implemented instructions by the healthcare provider computer 104 may form a special purpose computer or other particular machine that is operable to facilitate the processing of healthcare requests made by patients and the communication of information associated with healthcare transactions to a service provider computer 106. Additionally, in certain embodiments of the invention, the operations and/or control of each healthcare provider computer 104 may be distributed amongst several processing components.

In addition to having one or more processors 124, each healthcare provider computer 104 may include one or more memory devices 126, one or more input/output ("I/O") interface(s) 128, and one or more network interface(s) 130. The memory devices 126 may be any suitable memory device, for example, caches, read only memory devices, random access memory devices, magnetic storage devices, removable storage devices, etc. The memory devices 126 may store data, executable instructions, and/or various program modules utilized by the healthcare provider computer 104, for example, data files 132, an operating system ("OS") 134, and/or a client module 138, respectively. The data files 132 may include any suitable data that facilitates the receipt and/or processing of healthcare requests by the healthcare provider computer 104 and the generation and/or processing of healthcare transactions that are communicated to the service provider computer 106. For example, the data files 132 may include, but are not limited to, healthcare information and/or contact information associated with one or more patients, information associated with the particular healthcare provider and/or the respective healthcare provider computer 104, information associated with the service provider computer 106, information associated with one or more claims processors, and/or information associated with one or more healthcare transactions. The OS 134 may be any suitable software module that controls the general operation of the healthcare provider computer 104. The OS 134 may also facilitate the execution of other software modules by the one or more processors 124, for example, the client module 138. The OS 134 may be, but is not limited to, Microsoft Windows®, Apple OSX™, Linux, Unix, or a mainframe operating system.

The client module 138 may be an Internet browser or other suitable software, including a dedicated program, for interacting with the service provider computer 106. For example, a user 120 such as a pharmacist, pharmacy assistant, nurse practitioner, physician, nurse, or other pharmacy, hospital or physician's office employee may utilize the client module 138 in preparing and transmitting a healthcare transaction, such as a predetermination of benefits transaction, healthcare claim transaction, prescription claim or billing request, healthcare order transaction, or e-prescription transaction (i.e., electronic prescription order transaction, e-script, or e-prescription), to the service provider computer 106 for delivery to the appropriate claims processor computer 108 or other third-party for adjudication or other coverage/benefits determination. The healthcare provider computer 104 may also utilize the client module 138 to retrieve or otherwise receive data, messages, or responses from the service provider computer 106 and/or other components of the system 100.

The one or more I/O interfaces 128 may facilitate communication between the healthcare provider computer 104 and one or more input/output devices, for example, one or more user interface devices, such as, a display, keypad, control panel, touch screen display, remote control, microphone, etc. that facilitate user interaction with the healthcare provider computer 104. For example, the one or more I/O interfaces 128 may facilitate entry of information associated with a healthcare transaction by an employee 120 of a healthcare provider, such as a pharmacy employee, pharmacist, physician, nurse, hospital employee, or nurse practitioner affiliated with a pharmacy, hospital, physician's office or other similar healthcare provider. The one or more network interfaces 130 may facilitate connection of the healthcare provider computer 104 to one or more suitable networks, for example, the network 110 illustrated in FIG. 1. In this regard, the healthcare provider computer 104 may receive and/or communicate information to other network components (or entities) of the system 100, such as the service provider computer 106.

With continued reference to FIG. 1, the service provider computer 106 may include, but is not limited to, any suitable processor-driven device, such as an application server, that is configured for receiving, processing, and fulfilling requests from the one or more healthcare provider computers 104, the database server 109, and/or the claims processor computer 108 relating to pharmacy, benefits, billing, electronic prescription submission, and/or other healthcare transactions and/or other activities. In certain example embodiments, the service provider computer 106 may be a server (e.g., an application server) that acts as a switch/router that routes healthcare transactions and/or other healthcare requests. For example, the service provider computer 106 may be a server that routes predetermination of benefits transactions and healthcare claim transactions communicated from the healthcare provider computer 104 to a claims processor computer 108, such as a pharmacy benefits manager (PBM), an insurer, a Medicare payor, other governmental payor, or other third-party payor.

In certain embodiments, the service provider computer 106 may include a suitable host server, host module, or other software that facilitates the receipt of a healthcare transaction from a healthcare provider computer 104 and/or the routing of the received healthcare transaction to a claims processor computer 108. Any number of healthcare provider computers 104, database servers 109, and/or claims processor computers 108 may be in communication with the service provider computer 106, via the network 110 for example, as desired in various embodiments.

The service provider computer 106 may include any number of special purpose computers or other particular machines, application-specific circuits, microcontrollers, personal computers, minicomputers, mainframe computers, servers (e.g., application servers), networked computers, and/or other processor-driven devices. In certain embodiments, the operation of the service provider computer 106 may be controlled by computer-executed or computer-implemented instructions that are executed by one or more processors associated with the service provider computer 106 to form a special purpose computer or other particular machine that is operable to facilitate the receipt, routing, and/or processing of healthcare transactions. The one or more processors that control the operations of the service provider computer 106 may be incorporated into the service provider computer 106 and/or in communication with the service provider computer 106 via one or more suitable networks. In certain example embodiments, the operations and/or control of the service provider computer 106 may be distributed amongst several processing components.

Similar to the healthcare provider computer 104 described above, the service provider computer 106 may include one or more processors 140, one or more memory devices 142, one or more input/output ("I/O") interface(s) 144, and one or more network interface(s) 146. The one or more memory devices 142 may be any suitable memory devices, for example, caches, read only memory devices, random access memory devices, magnetic storage devices, removable memory devices, etc. The one or more memory devices 142 may store data, executable instructions, and/or various program modules utilized by the service provider computer 106, for example, data files 148, an operating system ("OS") 150, the host module 154, and a master queue service 190a. The master queue service may facilitate servicing database events as described herein The OS 150 may be a suitable software module that controls the general operation of the healthcare provider computer 104. The OS 150 may also facilitate the execution of other software modules by the one or more processors 140, for example, the master queue service 190a and/or the host module 154. The OS 150 may be, but is not limited to, Microsoft Windows®, Apple OSX™, Linux, Unix, or a mainframe operating system. The OS 150 may be a suitable software module that controls the general operation of the service provider computer 106 and/or that facilitates the execution of other software modules.

According to an example embodiment, the data files 148 may store healthcare transaction records associated with communications received from various healthcare provider computers 104 and/or various claims processor computers 108. The data files 148 may also store any number of suitable routing tables that facilitate determining the destination of communications received from a healthcare provider computer 104 or claims processor computer 108.

The host module 154 may receive, process, and respond to requests from the client module 138 of the healthcare provider computer 104, and may further receive, process, and respond to requests of the host module 172 of the claims processor computer 108, and/or the host module 194 (described below) of the database server 109. The service provider computer 106 may include additional program modules for performing other processing methods described herein. Those of ordinary skill in the art will appreciate that the service provider computer 106 may include alternate and/or additional components, hardware or software without departing from example embodiments of the invention.

With continued reference to the service provider computer 106, the one or more I/O interfaces 144 may facilitate communication between the service provider computer 106 and one or more input/output devices, for example, one or more user interface devices, such as a display, keypad, control panel, touch screen display, remote control, microphone, etc. that facilitate user interaction with the service provider computer 106. The one or more network interfaces 146 may facilitate connection of the service provider computer 106 to one or more suitable networks, for example, the network 110 illustrated in FIG. 1. In this regard, the service provider computer 106 may communicate with other components of the system 100.

With continued reference to FIG. 1, the claims processor computer 108 may be any suitable processor-driven device, such as an application server, that facilitates receiving, processing, and/or fulfilling healthcare transactions, such as predetermination of benefits transactions, healthcare claim transactions, prescription claim or billing requests, healthcare order transactions, or e-prescription transactions (i.e., electronic prescription order transactions, e-scripts, or e-prescriptions) received from the service provider computer 106. For example, the claims processor computer 108 may be a processor-driven device associated with a pharmacy benefits manager (PBM), an insurer, a Medicare or other government payor, or a claims clearinghouse. As desired, the claims processor computer 108 may include any number of special purpose computers or other particular machines, application-specific circuits, microcontrollers, personal computers, minicomputers, mainframe computers, servers (e.g., application servers), and the like.

In certain example embodiments, the operations of the claims processor computer 108 may be controlled by computer-executed or computer-implemented instructions that are executed by one or more processors associated with the claims processor computer 108 to form a special purpose computer or other particular machine that is operable to facilitate the receipt, processing, and/or fulfillment of healthcare transaction requests received from the service provider computer 106. The one or more processors that control the operations of the claims processor computer 108 may be incorporated into the claims processor computer 108 and/or in communication with the claims processor computer 108 via one or more suitable networks. In certain embodiments, the operations and/or control of the claims processor computer 108 may be distributed amongst several processing components.

Similar to other components of the system 100, the claims processor computer 108 may include one or more processors 158, one or more memory devices 160, one or more input/output ("I/O") interface(s) 162, and one or more network interfaces 164. The one or more memory devices 160 may be any suitable memory devices, for example, caches, read only memory devices, random access memory devices, magnetic storage devices, removable memory devices. The one or more memory devices 160 may store data, executable instructions, and/or various program modules utilized by the claims processor computer 108, for example, data files 166, an operating system ("OS") 168, a host module 172, and a master queue service 190b. The master queue service may facilitate servicing database events as described herein. The data files 166 may include any suitable information that is utilized by the claims processor computer 108 to process healthcare transactions, for example, patient profiles, patient insurance information, other information associated with a patient, information associated with a healthcare provider, etc. The operating system (OS) 168 may be a suitable software module that controls the general operation of the claims processor computer 108. The OS 168 may also facilitate the execution of other software modules by the one or more processors 158, for example, the master queue service 190b and/or the host module 172. The OS 168 may be, but is not limited to, Microsoft Windows®, Apple OSX™, Linux, Unix, or a mainframe operating system.

The host module 172 may initiate, receive, process, and/or respond to requests, such as healthcare transactions or claim requests, from the host module 154 of the service provider computer 106, and/or the host module 194 (described below) of the database server 109. The claims processor computer 108 may include additional program modules for performing other pre-processing or post-processing methods described herein. Those of ordinary skill in the art will appreciate that the claims processor computer 108 may include alternate and/or additional components, hardware or software without departing from the example embodiments described herein.

The one or more I/O interfaces 162 may facilitate communication between the claims processor computer 108 and one or more input/output devices, for example, one or more user interface devices, such as a display, keypad, control panel, touch screen display, remote control, microphone, etc. that facilitate user interaction with the claims processor computer 108. The one or more network interfaces 164 may facilitate connection of the claims processor computer 108 to one or more suitable networks, for example, the network 110. In this regard, the claims processor computer 108 may receive healthcare transactions and/or other communications from the service provider computer 106 and the claims processor computer 108 may communicate information associated with processing the healthcare transactions to the service provider computer 106.

The network 110 may include any telecommunication and/or data network, whether public, private, or a combination thereof, including a local area network, a wide area network, an intranet, the Internet, intermediate hand-held data transfer devices, and/or any combination thereof and may be wired and/or wireless. The network 110 may also allow for real-time, offline, and/or batch transactions to be transmitted between or among the healthcare provider computer 104, the service provider computer 106, the database 191, and/or the claims processor computer 108. Due to network connectivity, various methodologies, as described herein may be practiced in the context of distributed computing environments. Although the service provider computer 106 is shown for simplicity as being in communication with the healthcare provider computer 104, the claims processor computer 108, or the database server 109 via one intervening network 110, it is to be understood that any other network configuration is possible. For example, intervening network 110 may include a plurality of networks, each with devices such as gateways and routers for providing connectivity between or among networks 110. Instead of or in addition to a network 110, dedicated communication links may be used to connect the various devices in accordance with an example embodiment. For example, the service provider computer 106 may form the basis of network 110 that interconnects one or more of the healthcare provider computer 104, the claims processor computer 108, and the database server 109.

With continued reference to FIG. 1, the database server 109 may be any suitable processor-driven device, such as a database server, that facilitates providing database services to other computer programs or computers. For example, the database server 109 may provide database services to client devices, such as the service provider computer 106 and the claims processor computer 108. The database services can, for example provide for storage of data in one or more databases 191 and/or provide access to data stored in one or more databases 191. In certain example embodiments, the operations of the database server 109 may be controlled by computer-executed or computer-implemented instructions that are executed by one or more processors associated with the database server 109 to form a special purpose computer or other particular machine that is operable to facilitate the database services provided by the database server 109. The one or more processors that control the operations of the database server 109 may be incorporated into the claims database server 109 and/or in communication with the database server 109 via one or more suitable networks. In certain embodiments, the operations and/or control of the database server 109 may be distributed amongst several processing components.

Similar to other components of the system 100, the database server 109 may include one or more processors 197, one or more memory devices 192, one or more input/output ("I/O") interface(s) 198, and one or more network interfaces 199. The one or more memory devices 192 may be any suitable memory devices, for example, caches, read only memory devices, random access memory devices, magnetic storage devices, removable memory devices. The one or more memory devices 192 may store data, executable instructions, and/or various program modules utilized by the database server 109, for example, data files 195, an operating system ("OS") 193, a host module 194, and a DBMS 196. The data files 195 may include any suitable information that is utilized by the database server 109 to provide database services. The operating system (OS) 193 may be a suitable software module that controls the general operation of the database server 109. The OS 193 may also facilitate the execution of other software modules by the one or more processors 197, for example, the DBMS 196 and/or the host module 194. The OS 193 may be, but is not limited to, Microsoft Windows®, Apple OSX™, Linux, Unix, or a mainframe operating system.

The database(s) 191 may be operable to store information associated with various patients and/or various healthcare transactions. The patient and healthcare transaction data in the database 191 may be accessed and monitored by a DBMS, such as DBMS 196. In some embodiments, the database(s) 191 may include one or more tables, such as the database table 202 described in more detail below with regard to at least FIG. 2. For example, the database 191 may include a first claims table that stores patient claims data in a row and column format, a second database table that stores healthcare practitioner information in a row and column format, and/or the like. In the example, embodiment of a patient claims table, each row may represent a healthcare claim by a patient, and each row may include columns of data corresponding to that claim, such as a claim identifier (ID), a patient name, a healthcare provider ID, a claim type, a claim amount, and/or the like.

The DBMS 196 may be a suitable software module that facilitates access and management of one or more databases, such as database 191. In some embodiments, the DBMS 196 may include a trigger module, such as trigger module 204 described in more detail below with regard to at least FIG. 2. A trigger module may include code, e.g., provided in the DBMS 196, that is automatically executed in response to certain events, also referred to as "database events", on a particular table or view in a database, such as database 191. In some embodiments, a trigger module may be automatically executed in response to a database event, such as a change of the data in the database 191 (e.g., an insertion, deletion, or modification of data in a table of the database 191), and execution of the trigger module may write a record of the event (also referred to as a "database event record" or a "database change record") to a master input queue employed by a master queue service, such as the master input queue 210 described in more detail below with regard to at least FIG. 2. In some embodiments, a trigger module can be executed to write a record of the database event that includes an identification of the database event and/or associated data. For example, a trigger module may be automatically executed in response to a database event, such as a change of the patient name from "J Doe" to "John Doe" in a row of a claims table of the database 191 that includes a claim ID of "1234". When executed, the trigger module may write, to a master input queue employed by a master queue service, such as the master queue service 190*a* or 190*b*, a database event record that includes a key value that identifies a location of the change (e.g., a key value that includes the claim ID "1234" to identify the row where the patient name was changed) and/or related information (e.g., the identification of columns of the row that included the patient name change or other changes, the name data that was changed, and/or the like).

The one or more I/O interfaces 198 may facilitate communication between the database server 109 and one or more input/output devices, for example, one or more user interface devices, such as a display, keypad, control panel, touch screen display, remote control, microphone, etc. that facilitate user interaction with the database server 109. The one or more network interfaces 199 may facilitate connection of the database server 109 to one or more suitable networks, for example, the network 110. The database server 109 may, for example, receive healthcare data from and/or provide healthcare data to the service provider computer 106 and/or the claims processor computer 108 via the network interface 199 and the network 110.

The network 110 may include any telecommunication and/or data network, whether public, private, or a combination thereof, including a local area network, a wide area network, an intranet, the Internet, intermediate hand-held data transfer devices, and/or any combination thereof and may be wired and/or wireless. The network 110 may also allow for real-time, offline, and/or batch transactions to be transmitted between or among the healthcare provider computer 104, the service provider computer 106, the database 191, and/or the claims processor computer 108. Due to network connectivity, various methodologies, as described herein may be practiced in the context of distributed computing environments. Although the service provider computer 106 is shown for simplicity as being in communication with the healthcare provider computer 104, the claims processor computer 108, or the database server 109 via one intervening network 110, it is to be understood that any other network configuration is possible. For example, intervening network 110 may include a plurality of networks, each with devices such as gateways and routers for providing connectivity between or among networks 110. Instead of or in addition to a network 110, dedicated communication links may be used to connect the various devices in accordance with an example embodiment. For example, the service provider computer 106 may form the basis of network 110 that interconnects one or more of the healthcare provider computer 104, the claims processor computer 108, and the database server 109.

A master queue service application or module (MQS) (e.g., MQS 190*a* and/or MQS 190*b*) may include computer-executable instructions for servicing database events, such as those generated by a trigger module of the DBMS 196 of the database server 109. In some embodiments, a MQS is separate from an associated database and associated DBMS. For example, the MQS 190*a* and/or MQS 190*b* may each be a business logic layer, such as an application of an operating system 150 (e.g., a service application of the Microsoft Windows® operating system) that is separate from a DBMS. An MQS may be, for example, a service application executed by an operating system of a computer of the system. For example, the MQS 190*a* may be a service application executed by the operating system 150 of the service provider computer 106, and the MQS 190*b* may be a service application executed by the operating system 168 of the claims processor computer 108. An MQS may make calls to a DBMS to effectuate at least some of its operations. For example, as discussed herein the MQS 190*a* and/or 190*b* may make an SQL OUTPUT call to the DBMS 196 to move one or more database event records from a master input queue to a master output queue, the MQS 190*a* and/or 190*b* may make an SQL INSERT INTO call to the DBMS 196 to insert one or more database event records into process queues, the MQS 190*a* and/or 190*b* may make a SQL DELETE FROM call to the DBMS 196 to remove one or more database event records from a master output queue, and/or the like. Thus, in some embodiments, the MQS 190*a*, the MQS 190*b* and/or the DBMS 196 can execute in parallel, without significantly burdening one another. That is, for example, the MQS 190*a* may execute within the OS 150 to service database events including distributing database event records to process queues for processes, while a trigger module of the DBMS 196 can, in parallel, respond to a series of database events and provide corresponding database event records to a master input queue employed by the MQS 190*a*, as described in more detail herein and below with regard to at least FIGS. 2 and 3. Although certain embodiments are described with regard to a limited number of MQSs (e.g., MQS 190*a* and 190*b*), and a limited number of database systems (e.g., database server 109 including DBMS 196 and databases 191) for the purpose of illustration, embodiments can employ any number of MQSs 190 and/or databases systems. For example, a computer, such as service provider computer 106, can include multiple MQSs operating in parallel, and multiple database server systems 109 can be employed (e.g., including multiple DBMSs 196 and databases 191). In such a system, the servicing of events by a MQS can be provided for some or all of the various database systems. For example, if a second database server (e.g., similar to that of database server 109) is provided in the system 100 illustrated in FIG. 1, the master queue service 190*a* of the service provider computer 106 may receive and service database event records generated by the first DBMS 196 of the first database server 109 (e.g., in response to changes to one or more of the databases 191 managed by the database server 109), and the master queue service 190*a* may receive service database event records generated by a second DBMS of the second database server in response to changes to one or more of the databases managed by the second database server. Moreover, in some embodiments, a computer can include multiple MQSs. For example, continuing with the above example, the service provider computer 106 may include the first master queue service 190*a* that services database event records generated by a second DBMS 196 in response to changes to one or more of the databases managed by the second database server 109, and a second master queue service that services database event records generated by a second DBMS 196 in response to changes to one or more of the databases managed by the second database server 109.

An MQS can act as a conduit to receive indications of database events, identify processes that may rely on or otherwise be interested in the database events, and provide indications of the database events to those processes so that the processes can take appropriate action in response to the database events. Continuing with the above example relating to a healthcare system, the MQS 190*a* or 190*b* may receive, from a trigger module of DBMS 196, one or more database event records that indicate a change to the database 191 (e.g., including a database event record having the key value of "1234" and corresponding to the change of the patient's name from "J Doe" to "John Doe"). The MQS 190*a* or 190*b* may determine one or more processes of the system 100 (and/or processes of entities outside of the system 100) that may need to take action based on the database event, or may otherwise need to be informed of the database event, and may forward the one or more database event records (or indications thereof) to the one or more processes identified. Now aware of the database events, each of the one or more processes can individually process the database events. For example, each process can assess the database events associated with the database event records, determine whether the process requires additional action as a result of the database event (e.g., update another table to reflect the change of the patient's name from "J Doe" to "John Doe"), and perform any appropriate actions. Example operations for servicing database events, e.g., by the MQS 190*a* and/or 190*b*, are discussed in more detail below with regard to at least FIGS. 2 and 3.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. For example, in one example embodiment, the service provider computer 106 (or other computer) may be implemented as a specialized processing machine that includes hardware and/or software for performing the methods described herein. In addition, at least a portion of the processor and/or processing capabilities of the service provider computer 106 may be implemented as part of the claims processor computer 108. Accordingly, the example embodiments described herein should not be construed as being limited to any particular operating environment, system architecture, or device configuration.

Operational Overview

Figure 2:
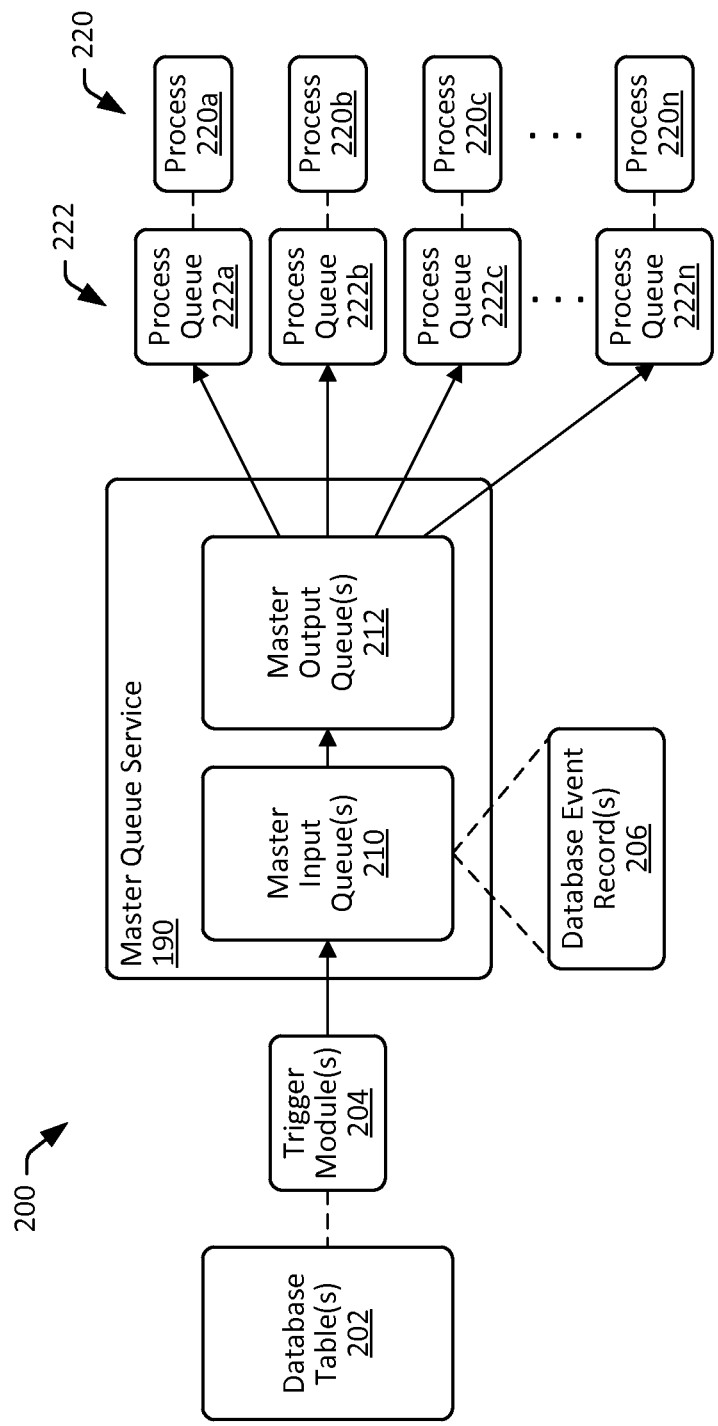
FIG. 2 is a block diagram that illustrates an example process for servicing database events in accordance with an example embodiment.

FIG. 2 is a block diagram that illustrates an example process 200 for servicing database events in accordance with an example embodiment. In some embodiments, the process 200 may include an MQS acting as a conduit to receive indications of database events, identify processes that may rely on or otherwise be interested in the database events, and provide indications of the database events to the identified processes so that the processes can take appropriate action to process or otherwise address the database events. Although certain embodiments are described below with regard to MQS 190a and DBMS 196 for the purpose of illustration, it will be appreciated that similar processes can be provided for other queue services, such as master queue service 190a, and/or trigger modules of DBMSs.

Referring to FIG. 2, in one embodiment, a trigger module 204 may be automatically executed in response to a database event, such as a change to a database table 202. The table 202 may include, for example, a claims table of the database 191. Such a database table 202 may, for example, store patient claims data in a row and column format. Each row may represent an insurance claim by a medical patient, and each row may include columns of data corresponding to that claim, such as a claim identifier (ID), a patient name, a healthcare provider ID, a claim type, a claim amount, and/or the like. A change to the database table 202 can include, for example, a change of a patient name from "J Doe" to "John Doe" in column "B" of the row associated with a claim ID of "1234". Such a change to a patient name may be initiated, for example, by a practitioner 120 via a healthcare provider computer 104. The change to the database table 202 may be effectuated by the DBMS 196, and the DBMS 196 may automatically execute the trigger module 204 in response to or otherwise in conjunction with making the change to the database table 202. When executed, the trigger module 204 may write a record of the database event (also referred to as a "database event record") 206 to a master input queue 210.

The master input queue 210 may include a table of database event records 206. The master input queue 210 may be a table of the database 191. In some embodiments, the trigger module 204 can be executable to write a database event record 206 that includes an identification of the database event and/or associated data. For example, the trigger module 204 may be automatically executed in response to a database event, such as a change of the patient name from "J Doe" to "John Doe" in a row for a claim having an ID of "1234" in the claims table in the database 191. When executed, the trigger module 204 may write, to the master input queue 210 employed by the MQS 190, a database event record 206 that includes a key value that identifies a location of the change (e.g., a key value that includes the claim ID "1234" to identify a row of the claims table where the patient name was changed) and/or related information. The related information can include the identification of columns of the row that included the patient name change or other changes (e.g., row "B"), the name data that was changed (e.g., "J Doe; John Doe"), and/or the like. Although a single master input queue is described in certain embodiments for the purpose of illustration, it will be appreciated that a master queue service can employ multiple master input queues, and/or a trigger module may write database event records to multiple master input queues. For example, the first master queue service 190a may maintain two master input queues 210, each one for servicing a different type of event, the second master queue service 190b may maintain a single master input queue 210, and the trigger module 204 may write a copy of each database event records 206 to each of the three of the master input queues 210 for processing by the respective master queue services 190a and 190b.

An MQS may monitor a master input queue 210, and, based at least in part on the monitoring, the MQS may determine when one or more database event records 206 are stored in the master input queue 210. For example, the MQS 190a may check the master input queue 210 periodically (e.g., about once every second) to determine if the master input queue 210 has any database event records 206 stored therein. In response to determining that the master input queue 210 does have one or more database event records 206 stored therein, the MQS may cause the one or more database event records 206 to be moved from the master input queue 210 to a master output queue 212. For example, in response to the MQS 190a determining that the master input queue 210 does have one or more database event records 206 stored therein, the MQS 190a may cause the one or more database event records 206 to be moved from the master input queue 210 to a master output queue 212. A master output queue 212 may include a table of database event records 206 that are moved from a master input queue 210. In some embodiments, a master output queue 212 may be a table maintained in a database, such as the database 191. Such a move operation may be accomplished, for example, by an atomic operation (e.g., an SQL OUTPUT operation) that executes both writing of the one or more database event records 206 to a master output queue 212 and deletion or removal of the one or more database event records 206 from a master input queue 210 simultaneously (e.g., in the same transaction). For example, in response to the MQS 190a determining that the master input queue 210 has one or more database event records 206 stored therein (e.g., including the database event record 206 having a key value of "1234"), the MQS 190a may make an SQL OUTPUT call to the DBMS 196 to move the one or more database event records 206 (e.g., including the database event record having a key value of "1234") from the table of master input queue 210 to the table of the master output queue 212. Thus, an MQS may cause moving, from the master input queue 210 to the master output queue 212, database event records 206 written to the master input queue 210 by the trigger module 204. Although a single master output queue is described in certain embodiments of for the purpose of illustration, it will be appreciated that a master queue service can employ multiple master output queues. For example, if the first master queue service 190a maintains two master input queues 210, the master queue service 190a may maintain two master output queues 212, with each of the respective master output queues 212 corresponding to one of the master input queues 210.

An MQS may determine one or more processes 220 (e.g., processes 220a-220n) associated with the database event records 206. This can include, for example, identifying one or more processes 220 (e.g., some or all of processes 220a-220n) that may need to take action based on the database events relating to the database events records 206, or may otherwise need to be informed of the database events relating to the database events records 206. The processes 220 can include processes of system 100 and/or processes of entities outside of the healthcare system 100. For example, if a separate list of names of patients that have filed healthcare claims is maintained in the data files 148 of the service provider computer 106 and a first process 220a is responsible for maintaining that list, the MQS 190a may determine that the first process 220a is associated with the one or more database event records 206 in the master output queue 212 based at least in part on the first process 220a being dependent on the patient name data included in the database table 202. In some embodiments, an MQS may make such a determination based on a predetermined mapping of relationships between database events and processes 220. For example, a database event-process map 149 stored in memory 142 may indicate that the first process 220a is to be informed of database events relating to the claims table 202. In response to the MQS 190a determining that a database event record 206 is stored in the master output queue 212 corresponds to the claims table 202, the MQS 190a may use the mapping to identify at least the first process 220a as being associated with the database event record 206. For example, the MQS 190a may determine that the database event record 206 having a key value of "1234" is associated with the claims table 202 of the database 191, the MQS 190a may determine that the database claims table 202 is associated with the process 220a based on the database event-process map 149 stored in memory 142, and the MQS 190a may associate the process 220a with the database event record 206 based on those determinations.

An MQS may add database event records 206 to a process queue 222 for each of the one or more processes 220 determined to be associated with the database event records 206. A process queue 222 for a process 220 may include a table of database event records 206 that are to be addressed by the process 220. A process queue 222 may be a table of the database 191. Continuing with the above example, if the MQS 190a identifies three processes 220, including a first process 220a, a second process 220b and third process 220c, as being associated with the one or more database event records 206 stored in the master output queue 212, the MQS 190a may move the one or more database event records 206 to a first process queue 222a for the first process 220a, a second process queue 222b for the second process 220b and a third process queue 222c for the third process 220c. The process queues 222 can include queues for a process, and need not be a table maintained in the database 191. For example, if the process 220c is a messaging queuing service (MSMQ), the process queue can include a queue of the MSMQ. As a further example, if the process 220c is a RabbitMQ message brokering service, the process queue can include a queue of the RabbitMQ message brokering service maintained in a data store associated with the application.

In some embodiments, the move operation may not remove database event records 206 from the master output queue 212 until it is determined that the database event records 206 have been successfully written to the destination process queues 222. For example, the MQS 190a may cause the one or more database event records to be copied from the master output queue 212 to the process queues 222a, 222b and 222c. Such a copy operation may be accomplished via the MQS 190a making an SQL INSERT INTO call to the DBMS 196 to insert the one or more database event records 206 (e.g., including the change record having a key value of "1234") into the process queues 222a, 222b and 222c. The MQS 190a may then, in response to receiving an indication that the database event records 206 were successfully written to the process queues 222a, 222b and 222c, cause the database event records 206 to be deleted from the master output queue 212. Such a deletion operation may be accomplished via the MQS 190a making an SQL DELETE FROM call to the DBMS 196 to remove the one or more database event records 206 (e.g., including the change record having a key value of "1234") from the master output queue 212. In some embodiments, if an MQS does not receive an indication that the one or more database event records 206 have been successfully written to the destination process queues, then the MQS may reattempt to write the one or more database event records 206 to the process queues 222. For example, if the MQS 190a receives an indication that the one or more database event records 206 were successfully written to the process queues 222a and 222b, but does not receive such an indication for the write to the third process queue 222c, then the MQS 190a may initiate another copy operation to copy the one or more database event records 206 to the third process queue 222c.

A process 220 may monitor its process queue 222 and take appropriate action to process any database event records 206 stored therein. For example, if the one or more database event records 206 written to the process queue 222a include the key value "1234" the process 220a may query the DBMS 196 for the data currently stored in the row corresponding to the key value "1234", the process 220a may determine that the patient name in the row has changed from "J Doe" to "John Doe", and the process 220a may update the list of names of patients that have filed healthcare claims (e.g., maintained in the data files 148) to reflect the change to the name. For example, the process 220a may cause the name "J Doe" in the list to be changed to "John Doe". Similarly, if the one or more database events 206 written to the process queue 222a include the key value "2134" corresponding to a row of the claims table 202 in which a claim date was changed, the process 220a may query the DBMS 196 for the data currently stored in the row corresponding to the key value "2134", the process 220a may determine that the only information that changed was the date, and since it has no effect on the list of names that the process 220a may not take any substantive action.

In response to processing a database event record 206, the database event record 206 may be removed from the process queue 222. Continuing with the above example, in response to the process 220a processing the database event record 206 having the key value of "1234", the process 220a may make a SQL DELETE FROM call to the DBMS 196 to remove the database event record 206 having the key value of "1234" from the first process queue 222a. Each of the database event records 206 stored in a process queue 222 may be addressed in a similar manner by the corresponding process 220. Removal of the database event records 206 from a process queue 222 maintained by an application can be accomplished in a similar manner. For example, if the process 220c is a messaging queuing service (MSMQ), and the MSMQ completes processing of a database event records 206, the MSMQ can remove the database event records 206 from its queue. As a further example, if the process 220c is a RabbitMQ message brokering service, the RabbitMQ message brokering service queue can include a queue of the RabbitMQ message brokering service can remove the database event records 206 from its queue.

Figure 3:
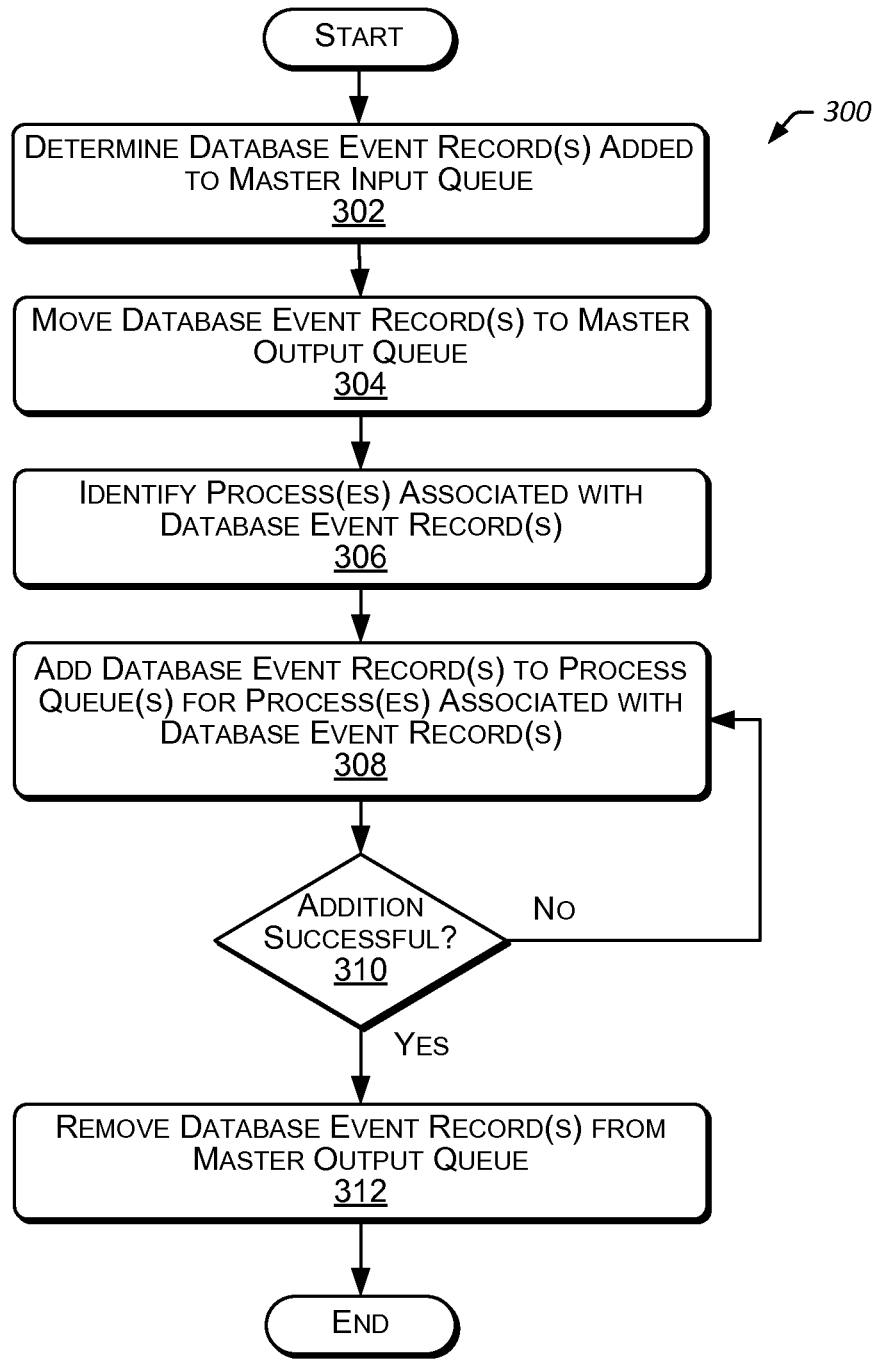
FIG. 3 is a flow chart diagram that illustrates an example method for servicing database events in accordance with an example embodiment.

FIG. 3 is a flow chart diagram that illustrates an example method 300 for servicing database events in accordance with an example embodiment. In some embodiments, method 300 may be performed by a master service queue application, the MQS 190 illustrated in FIG. 1, operating on a computer device, such as service provider computer 106 and/or the claims processor computer 108. Although certain embodiments are described with regard to a particular master queue service, such as MQS 190a, it will be appreciated that a similar method can be provided by other MQSs, such as MQS 190b and/or the like.

At block 302, it may be determined that one or more database event records have been added to a master input queue. In some embodiments, determining that one or more database event records have been added to a master input queue can include the MQS 190 determining that one or more database event records are present in the master input queue 210. For example, the trigger module 204 may be automatically executed in response to a database event, such as the change of the patient name from "J Doe" to "John Doe" in a row for a claim having an ID of "1234" in the claims table in the database 191. When executed, the trigger module 204 may write, to the master input queue 210, a database event record 206 that includes a key value that identifies a location of the change (e.g., a key value that includes the claim ID "1234" to identify a row of the claims table where the patient name was changed) and/or related information. The MQS 190a may check the master input queue 210 periodically (e.g., about once every second) to determine if the master input queue 210 has any database event records 206 stored therein. In response to determining that the master input queue 210 does have one or more database event records 206, the MQS 190a may check the master input queue 210 periodically (e.g., about once every second) to determine if the master input queue 210 has any database event records 206 stored therein. After one or more database events 206 (including the database event record 206 having a key value of "1234") are written to master input queue 210, the MQS 190a may determine that one or more database event records 206 are present in the master input queue 210.

At block 304, the one or more database event records may be moved to a master output queue. In some embodiments, moving the one or more database event records moved to a master output queue can include a MQS performing or otherwise causing a move operation to move the one or more database event records 206 (determined to have been added to a master input queue 210, at block 302) to the master output queue 212. For example, in response to the MQS 190a determining that the master input queue 210 has one or more database event records 206 stored therein (e.g., including the database event record 206 having a key value of "1234"), the MQS 190a may make a SQL OUTPUT call to the DBMS 196 to move the one or more database event records 206 (e.g., including the database event record having a key value of "1234") from the table of master input queue 210 to the table of the master output queue 212.

At block 306, one or more processes associated with the one or more database event records may be identified. In some embodiments, identifying one or more processes associated with the database event records can include an MQS identifying one or more processes 220 that may need to take action based on the database events relating to the database events records 206, or may otherwise need to be informed of the database events relating to the database events records 206. For example, if a separate list of names of patients that have filed healthcare claims is maintained in the data files 148 of the service provider computer 106 and a first process 220a is responsible for maintaining that list, the MQS 190a may determine that the first process 220a is associated with the one or more database event records 206 in the master output queue 212 based at least in part on the first process 220a being dependent on the patient name data included in the database table 202. In some embodiments, an MQS may make such a determination based on a predetermined mapping of relationships between database events and processes 220. For example, a database event-process map 149 stored in memory 142 may indicate that the first process 220a is to be informed of database events relating to the claims table 202. In response to the MQS determining that a database event record 206 is stored in the master output queue 212 corresponds to the claims table 202, the MQS may use the mapping to identify at least the first process 220a as being associated with the database event record 206. For example, the MQS 190a may determine that the database event record having a key value of "1234" is associated with the claims table 202 of the database 191, the MQS 190a may determine that the database claims table 202 is associated with the process 220a based on the database event-process map 149 stored in memory 142, and the MQS 190a may associate the process 220a with the database event record 206 based on those determinations.

At block 308, the one or more database event records may be added to the process queues for the one or more processes identified as being associated with the one or more database event records. In some embodiments, adding the one or more database event records to the process queues for the one or more processes identified as being associated with the one or more database event records can include the MQS adding or otherwise causing the addition of the database event records 206 to a process queue 222 for each of the one or more processes 220 determined to be associated with the database event records 206. Continuing with the above example, if the MQS 190a identifies three processes 220, including a first process 220a, a second process 220b and a third process 220c, as being associated with the one or more database event records 206 stored in the master output queue 212, then the MQS 190a may add the one or more database event records 206 to the first process queue 222a for the first process 220a, the second process queue 222b for the second process 220b and the third process queue 222c for the third process 220c. The addition may include, the MQS 190a causing the one or more database event records 206 to be copied from the master output queue 212 to the process queues 222a, 222b and 222c. Such a copy operation may be accomplished, for example, via the MQS 190a making a SQL INSERT INTO call to the DBMS 196 to insert the one or more database event records 206 (e.g., including the change record having a key value of "1234") into the process queues 222a, 222b and 222c.

At block 310, it can be determined whether the addition of the one or more database event records to the process queues for the one or more processes identified was successful. If it is determined that the addition of the one or more database event records to the process queues for the one or more processes identified was successful, then the method 300 may proceed to block 312, where the one or more database event records are removed from the master output queue. If it is determined that the addition of the one or more database event records to the process queues for the one or more processes identified was not successful, then the method 300 may return to block 308, to reattempt the addition of the one or more database event records are removed from the master output queue to the process queues for the one or more processes identified. In some embodiments, determining whether the addition of the one or more database event records to the process queues for the one or more processes identified was successful can include the MQS determining whether the addition of the one or more database event records 206 to the process queues 222 for the one or more processes 220 identified was successful. In some embodiments, the move operation may not remove database event records 206 from the master output queue 212 until it is determined that the database event records 206 have been successfully written to the destination process queues 222. Continuing with the above example, in response to the MQS 190a receiving an indication of or otherwise determining that the database event records 206 were successfully written to the process queues 222a, 222b and 222c, the MQS 190a may cause the database event records 206 to be deleted from the master output queue 212. Such a deletion operation may be accomplished, for example, via the MQS 190a making a SQL DELETE FROM call to the DBMS 196 to remove the one or more database event records 206 (e.g., including the change record having a key value of "1234") from the master output queue 212. In some embodiments, if the MQS does not receive an indication that the one or more database event records 206 have been successfully written to the destination process queues 222, then the MQS may reattempt to write the one or more database event records 206 to the process queues 222. For example, if the MQS 190a receives an indication that the one or more database event records 206 were successfully written to the process queues 222a and 222b, but does not receive such an indication of or otherwise determine that the write to the third process queue 222c was successful, then the MQS 190a may initiate another copy operation to copy the one or more database event records 206 to the third process queue 222c.

As described above, a process 220 may monitor its process queue 222 and take appropriate action to process any database event records 206 stored therein. For example, if the one or more database event records 206 written to the process queue 222a include the key value "1234" the process 220a may query the DBMS 196 for the data currently stored in the row corresponding to the key value "1234", the process 220a may determine that the patient name in the row has changed from "J Doe" to "John Doe", and the process 220a may update the list of names of patients that have filed healthcare claims (e.g., maintained in the data files 148) to reflect the change to the name. For example, the process 220a may cause the name "J Doe" in the list to be changed to "John Doe". Similarly, if the one or more database events 206 written to the process queue 222a include the key value "2134" corresponding to a row of the claims table 202 in which a claim date was changed, the process 220a may query the DBMS 196 for the data currently stored in the row corresponding to the key value "2134", the process 220a may determine that the only information that changed was the date, and since it has no effect on the list of names that the process 220a may not take any substantive action.

In response to processing a database event record 206, a process 220 may remove the database event record 206 from the process queue 222. Continuing with the above example, in response to the process 220a processing the database event record 206 having the key value of "1234", the process 220a may make a SQL DELETE FROM call to the DBMS 196 to remove the database event record 206 having the key value of "1234" from the first process queue 222a. Each of the database event records 206 stored in a process queue 222 may be addressed in a similar manner by the corresponding process 220. Removal of the database event records 206 from a process queue 222 maintained by an application can be accomplished in a similar manner. For example, if the process 220c is a messaging queuing service (MSMQ), and the MSMQ completes processing of a database event records 206, the MSMQ can remove the database event records 206 from its queue. As a further example, if the process 220c is a RabbitMQ message brokering service, the RabbitMQ message brokering service queue can remove the database event records 206 from its queue.

The method described and shown in FIG. 3 may be carried out or performed in any suitable order as desired in various embodiments. Additionally, in certain example embodiments, at least a portion of the operations may be carried out in parallel. Furthermore, in certain example embodiments, less than or more than the operations described in FIG. 3 may be performed.

Accordingly, example embodiments disclosed herein can provide the technical effects of servicing database events, such as changes to database information, for example, by a master queue service that employs master input queues, master output queues, and process queues and related functions to shuttle data event records generated by a trigger module to associated processes for processing. In this regard, such a multi-queue configuration may enable the master queue service to efficiently intake database event records, significantly reducing the amount of time the database trigger may be blocked by other processes when operating directly from the trigger, thereby allowing the database trigger to quickly and efficiently process database events, including executing the writing of data event records to the master input queue for a master queue service. This can help to reduce delays associated with execution of the database triggers, thereby improving the overall performance of the database and the DBMS.

Various block and/or flow diagrams of systems and methods and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram step or steps. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram step or steps.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method, comprising:
   executing, by a database management system, a database trigger module in response to a change in a database table;
   inserting, by the database trigger module of the database management system, one or more database event records into a master input queue table of a master queue service of a computer system, wherein at least one of the one or more database records identifies the change in the database table of the database management system;
   determining, by the master queue service, that the one or more database event records are present in the master input queue table;
   causing, by the master queue service, moving of the one or more database event records from the master input queue table to a master output queue table;
   determining, by the master queue service, one or more processes associated with the one or more database event records by evaluating a mapping of relationships between the one or more processes and database event in each of the one or more database event records; and
   causing, by the master queue service, adding of the one or more database event records to one or more process queue tables for each one of the one or more processes based at least in part on the mapping of relationships.

2. The computer-implemented method of claim 1, wherein at least one of the one or more database event records corresponds to an occurrence of a change of data in the database, and wherein the at least one of the one or more database event records that corresponds to an occurrence of the change of data in the database comprises an indication of the data that changed.

3. The computer-implemented method of claim 1, wherein at least one of the one or more database event records that corresponds to an occurrence of a change of data in a row of a table of the database, and wherein the at least one of the one or more database event records comprises a key value identifying the row of the table of the database in which the data is changed.

4. The computer-implemented method of claim 1, wherein the database trigger module is automatically executed by the database management system in response to the change in the database table.

5. The computer-implemented method of claim 1, wherein the master queue service comprises an application executed by a computer operating system of the computer system that is configured to execute in parallel with execution of the database management system.

6. The computer-implemented method of claim 1, wherein causing moving of the one or more database event records from the master input queue table to the master output queue table comprises executing an atomic operation to cause the following operations to occur in a same data transaction:
   writing the one or more database event records to the master output queue table; and
   deleting the one or more database event records from the master input queue table.

7. The computer-implemented method of claim 1, wherein causing moving of the one or more database event records from the master input queue table to the master output queue table comprises executing a structured query language (SQL) OUTPUT operation to cause the following operations to occur in a same data transaction:
   writing the one or more database event records to the master output queue table; and
   deleting the one or more database event records from the master input queue table.

8. The computer-implemented method of claim 1, wherein causing adding of the one or more database event records to the one or more process queue tables for each one of the one or more processes comprises inserting, for each of the one or more processes, the one or more database event records to a process queue table for the process.

9. The computer-implemented method of claim 8, the method further comprising:
   determining that the one or more database event records are successfully written to the process queue for each of the one or more processes; and
   causing, in response to determining that the one or more database event records are successfully written to the process queue for each of the one or more processes, removing of the one or more database event records from the master output queue.

10. The computer-implemented method of claim 1, wherein at least one of the master input queue table and the master output queue table is a table stored in the database.

11. A system comprising:
   at least one memory operable to store computer-executable instructions; and
   at least one processor configured to access the at least one memory and execute the computer-executable instructions to:
      execute, by a database management system, a database trigger module in response to a change in a database table;
      insert, by the database trigger module of the database management system, one or more database event records into a master input queue table of a master queue service of a computer system, wherein at least one of the one or more database records identifies the change in the database table of the database management system;
      determine, by the master queue service, that the one or more database event records are present in the master input queue table;

cause, by the master queue service, moving of the one or more database event records from the master input queue table to a master output queue table;

determine, by the master queue service, one or more processes associated with the one or more database event records by evaluating a mapping of relationships between the one or more processes and database event in each of the one or more database event records; and cause, by the master queue service, adding of the one or more database event records to one or more process queue tables for each one of the one or more processes based at least in part on the mapping of relationships.

12. The system of claim 11, wherein at least one of the one or more database event records corresponds to an occurrence of a change of data in the database, and wherein the at least one of the one or more database event records that corresponds to an occurrence of a change of data in the database comprises an indication of the data that changed.

13. The system of claim 11, wherein at least one of the one or more database event records that corresponds to an occurrence of a change of data in a row of a table of the database, and wherein the at least one of the one or more database event records comprises a key value identifying the row of the table of the database in which the data is changed.

14. The system of claim 11, wherein the database trigger module is automatically executed by the database management system in response to the change in the database table.

15. The system of claim 14, wherein the master queue service comprises an application executed by a computer operating system that is configured to execute in parallel with execution of the database management system.

16. The system of claim 11, wherein causing moving of the one or more database event records from the master input queue table to the master output queue table comprises executing an atomic operation to cause the following operations to occur in a same data transaction:

writing the one or more database event records to the master output queue table; and deleting the one or more database event records from the master input queue table.

17. The system of claim 11, wherein causing adding of the one or more database event records to the one or more process queue tables for each one of the one or more processes comprises inserting, for each of the one or more processes, the one or more database event records to a process queue table for the process.

18. The system of claim 17, wherein the instructions are further executable by the at least one processor to cause:

determine that the one or more database event records are successfully written to the process queue for each of the one or more process; and cause, in response to determining that the one or more database event records are successfully written to the process queue for each of the one or more process, removing of the one or more database event records from the master output queue.

19. A non-transitory computer-readable storage medium comprising program instructions stored thereon that are executable by one or more processors to:

execute, by a database management system, a database trigger module in response to a change in a database table;

insert, by the database trigger module of the database management system, one or more database event records into a master input queue table of a master queue service of a computer system, wherein at least one of the one or more database records identifies the change in the database table of the database management system;

determine, by the master queue service, that the one or more database event records are present in master input queue table;

cause, by the master queue service, moving of the one or more database event records from the master input queue table to a master output queue table;

determine, by the master queue service, one or more processes associated with the one or more database event records by evaluating a mapping of relationships between the one or more processes and database event in each of the one or more database event records;

cause, by the master queue service, adding of the one or more database event records to one or more process queue tables for each one of the one or more processes based at least in part on the mapping of relationships.

\* \* \* \* \*